United States Patent
Yan et al.

(10) Patent No.: US 10,242,308 B2
(45) Date of Patent: Mar. 26, 2019

(54) RFID SENSING AND RECORDING DEVICE AND METHOD FOR MAKING THE SAME

(71) Applicant: Securitag Assembly Group Co., Ltd, Taichung (TW)

(72) Inventors: Tian lin Yan, Taichung (TW); Cheng hung Chang, Taichung (TW); Way Yu Chen, Taichung (TW)

(73) Assignee: Securitag Assembly Group Co., Ltd, Taichung (TW)

(*) Notice: Subject to any disclaimer, the term of this patent is extended or adjusted under 35 U.S.C. 154(b) by 153 days.

(21) Appl. No.: 15/442,460

(22) Filed: Feb. 24, 2017

(65) Prior Publication Data
US 2018/0174017 A1 Jun. 21, 2018

(30) Foreign Application Priority Data
Dec. 19, 2016 (TW) .............................. 105142042 A

(51) Int. Cl.
*G06K 19/06* (2006.01)
*G06K 19/077* (2006.01)
(Continued)

(52) U.S. Cl.
CPC ... *G06K 19/07779* (2013.01); *G06K 7/10336* (2013.01); *G06K 19/0702* (2013.01)

(58) Field of Classification Search
CPC ....... G06K 19/0702; G06K 19/0716–19/0719; G06K 19/0723; G06K 19/07745
(Continued)

(56) References Cited

U.S. PATENT DOCUMENTS

| 7,888,604 B2 | 2/2011 | Kawate et al. |
| 8,378,917 B2 | 2/2013 | Yoneda et al. |

(Continued)

FOREIGN PATENT DOCUMENTS

| TW | I274949 | 3/2007 |
| TW | 201042816 A1 | 12/2010 |

(Continued)

OTHER PUBLICATIONS

Taiwanese Office Action, dated Sep. 29, 2017, in a counterpart Taiwanese patent application, No. TW 105142042.

*Primary Examiner* — Thien M Le
*Assistant Examiner* — April A Taylor
(74) *Attorney, Agent, or Firm* — Chen Yoshimura LLP

(57) ABSTRACT

The present invention provides a radio frequency identification and sensing device comprising an antenna module, a RFID sensing module, and battery module. The antenna module has a first flexible substrate having an antenna circuit formed thereon. The RFID sensing module comprises a second flexible substrate, a RFID chip, a sensor formed on the second flexible substrate and a memory module formed on the second flexible substrate, wherein the sensor is utilized to detecting an environmental status for generating a plurality of sensing data, and the memory module is utilized to store the plurality of sensing data. The RFID chip is utilized to transfer the plurality of data to a reading device. The battery module is utilized to provide electrical power for operating the RFID sensing module.

12 Claims, 8 Drawing Sheets

(51) Int. Cl.
*G06K 7/10* (2006.01)
*G06K 19/07* (2006.01)

(58) Field of Classification Search
CPC ....... G06K 19/07747; G06K 19/07749; G06K 19/0775; G06K 19/07777; G06K 19/07779
See application file for complete search history.

(56) References Cited

U.S. PATENT DOCUMENTS

| | | | |
|---|---|---|---|
| 8,511,569 B1 * | 8/2013 | Koepp | G06K 19/07752 |
| | | | 235/492 |
| 8,516,683 B2 | 8/2013 | Credelle et al. | |
| 8,823,597 B2 | 9/2014 | Wang et al. | |
| 8,851,356 B1 | 10/2014 | Holec et al. | |
| 9,619,743 B1 * | 4/2017 | Yan | G06K 19/0723 |
| 2005/0001785 A1 * | 1/2005 | Ferguson | G06K 19/07745 |
| | | | 343/895 |
| 2007/0008477 A1 | 1/2007 | Huang | |
| 2008/0203173 A1 | 8/2008 | Baba | |
| 2010/0127084 A1 | 5/2010 | Pavate et al. | |
| 2010/0196744 A1 * | 8/2010 | Tucholski | G06K 19/0702 |
| | | | 429/7 |
| 2013/0271265 A1 | 10/2013 | Finn | |
| 2013/0320093 A1 | 12/2013 | Lin et al. | |
| 2015/0129667 A1 | 5/2015 | Pavate et al. | |
| 2015/0186768 A1 | 7/2015 | Peters et al. | |
| 2016/0003895 A1 | 1/2016 | Farr et al. | |
| 2016/0301175 A1 | 10/2016 | Chen et al. | |
| 2016/0328584 A1 * | 11/2016 | Rokhsaz | H01Q 5/335 |

FOREIGN PATENT DOCUMENTS

| | | |
|---|---|---|
| TW | 201331846 A1 | 8/2013 |
| TW | 201636185 A | 10/2016 |

* cited by examiner

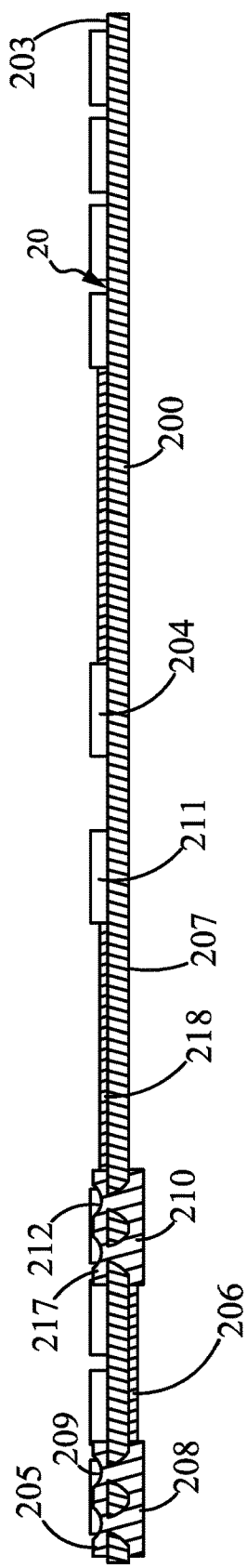
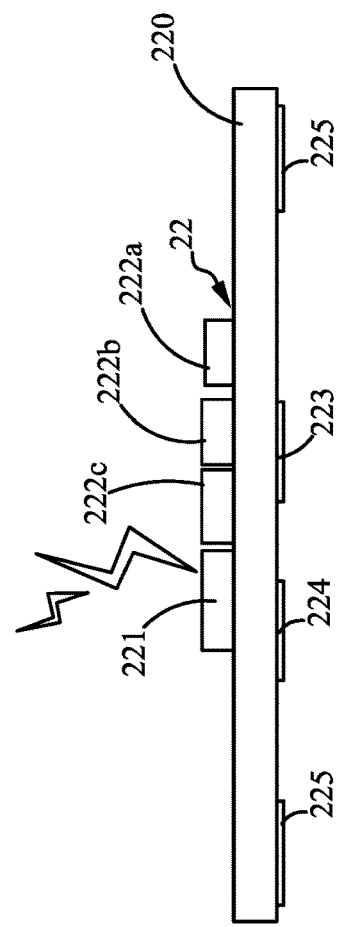
Fig. 3A
Fig. 3B

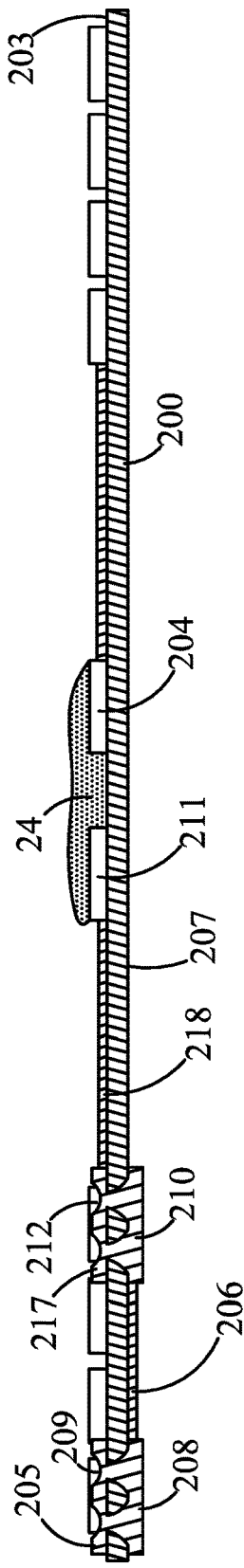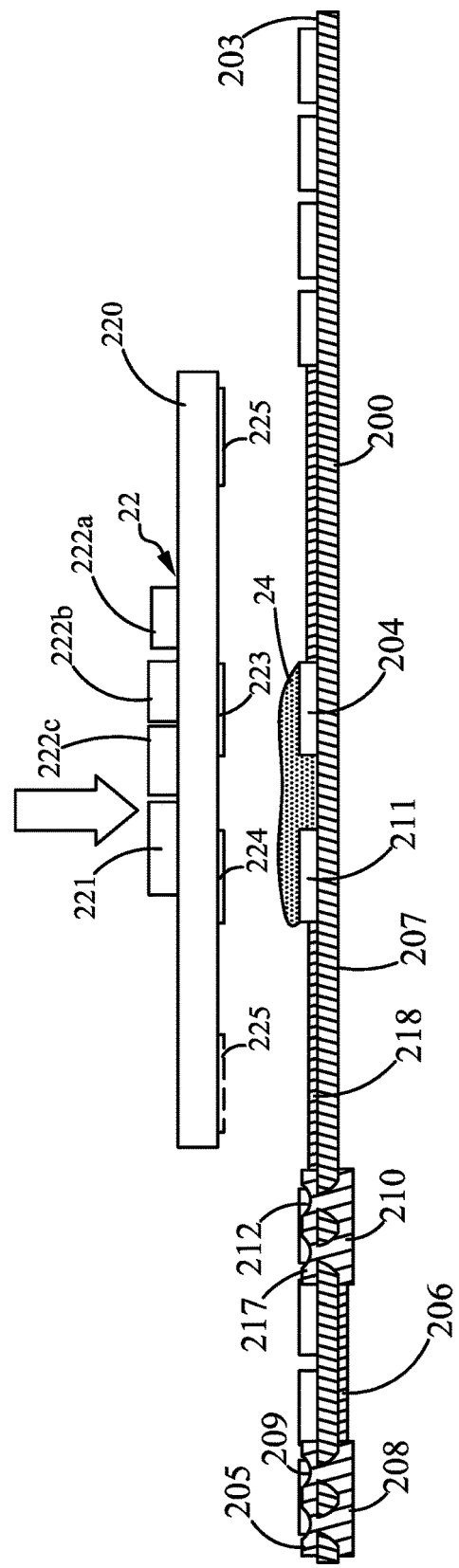

RFID SENSING AND RECORDING DEVICE AND METHOD FOR MAKING THE SAME

This application claims the benefit of Taiwan Patent Application Serial No. 105142042, filed Dec. 19, 2016, the subject matter of which is incorporated herein by reference.

BACKGROUND OF INVENTION

1. Field of the Invention

The present invention is related to a radio frequency identification technique, and more particularly, to a RFID sensing and recording device having electric power supply capability and formed by connecting the antenna module to circuit substrate through conductive adhesives and pressing process.

2. Description of the Prior Art

Radio frequency identification (RFID) is a wireless communication technology that is an integration of wireless information process technology, read/write module, and RFID device. The RFID device comprises a chip circuit and antenna coil so that contactless reading and/or writing of data to the RFID device through RFID reader can be performed to acquired the information stored in the RFID device. The acquired information can be processed, utilized and applied in various kinds of electrical application such as door access control, and vehicle immobilizer system, for example.

For the past few years, the portable electronic devices, such as smart portable devices and IC card are popular to the public so that the need of radio frequency technology integration is gradually increased. In one application, the RFID device further comprises a substrate module having RFID chipset and passive components, and an antenna module having antenna coil designed according to the frequency range and material.

In addition, the solutions integrating the RFID tag with power supply are also increased with the requirement of product applications. For example, the smart home with intelligent living, transportation, logistics, and medical care in the Internet of Things (IoT) require big data collection, this requirement can be efficiently solved through a combination of RFID tag, sensor and power supply. However, when these components are combined together, the thickness of the combined device will be increased. Accordingly, how to provide a solution that can have thin and light device with the abovementioned components becomes a more important issue in the development of RFID technology.

Conventionally, the substrate module and antenna module are electrically bonded through a reflow process. In order to prevent the substrate module and antenna module from heat damage during the reflow process, the substrate of the substrate module is necessary to be made of the material with high temperature resistant capability. However, such kind of material will increase the cost of making the RFID device, the bulk volume and thickness dimension.

Accordingly, there has a need to provide a radio frequency identification device with sensing, recording, and power supplying capabilities and corresponding manufacturing method to solve the problem of the conventional arts.

SUMMARY OF THE INVENTION

The present invention provides a RFID sensing and recording device, comprising a RFID sensing module having a flexible substrate on which a RFID tag, sensor and storage module are arranged, a battery module for providing electric power, and a flexible antenna module. With the supply of the electric power, integration of sensing and storing capability, the RFID sensing and recording device of the present invention can be applied in various kinds of fields such as internet of things, interface of human-computer interaction, smart living, smart logistics, and medical care.

The present invention provides a method for making RFID sensing and recording device, wherein a flexible antenna module is electrically bonded with a RFID sensing module having RFID chip and passive elements through adhesives and pressing procedure, whereby a reflow process can be eliminated thereby reducing the manufacturing cost, and the RFID sensing and recording device is enabled to become thinner and lighter thereby reducing the weight of the RFID sensing and recording device.

The present invention provides method for making RFID sensing and recording device, wherein the area between electric pads formed on the substrate of the antenna module does not have antenna coil passing therethrough so that the circuit layout of the electrical connection between the substrate module and antenna module can be simplified thereby simplifying the manufacturing process of electrical connection between the substrate module and antenna module.

In one embodiment, a RFID sensing and recording device comprises an antenna module, a RFID sensing module, and a battery module. The antenna module comprises a first flexible substrate, an antenna circuit formed on the first flexible substrate, and a first electric pad and a second electric pad formed on a first surface of the flexible substrate, wherein the first and second electric pads are electrically coupled to the antenna circuit. The RFID sensing module comprises a second flexible substrate, and a pair of third electric pads, a RFID chip, a sensor, and a storage module respectively formed on the second flexible substrate, wherein the pair of third electric pads are electrically coupled to the first and second electric pads, respectively, the sensor is utilized to detect a status information and generate a plurality of status data corresponding to the status information, and the storage module is electrically coupled to the sensor and RFID chip for storing the plurality of status data. The battery module is electrically coupled to the RFID sensing module for providing electric power to the RFID sensing module.

In another embodiment, a method for making a RFID sensing and recording device, comprising steps of providing an antenna module which comprises a first flexible substrate, an antenna circuit formed on the first flexible substrate, and a first electric pad and a second electric pad formed on a first surface of the first flexible substrate, wherein the first and second electric pads are electrically coupled to the antenna circuit, providing a RFID sensing module, comprising a second flexible substrate, and a pair of third electric pads, a RFID chip, a sensor, a pair of electrodes, and a storage module respectively formed on the second flexible substrate, wherein the pair of third electric pads are electrically coupled to the first and second electric pads, respectively, the sensor is utilized to detect a status information and generate a plurality of status data corresponding to the status information, and the storage module is electrically coupled to the sensor and RFID chip for storing the plurality of status data, forming a first conductive adhesive on the first and second electric pads or the pair of third electric pads, electrically connecting the pair of third electric pads to the first and second electric pads, and electrically connecting a battery module to the RFID sensing module.

All these objects achieved by the RFID sensing and recording device and method for making such kind device are described below.

BRIEF DESCRIPTION OF THE DRAWINGS

The present invention will now be specified with reference to its preferred embodiment illustrated in the drawings, in which:

FIGS. 3A to 3F illustrate a flow for making the RFID sensing and recording device according to one exemplary embodiment of the present invention.

DESCRIPTION OF THE PREFERRED EMBODIMENT

The invention disclosed herein is directed to a RFID sensing and recording device and method for making the same. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
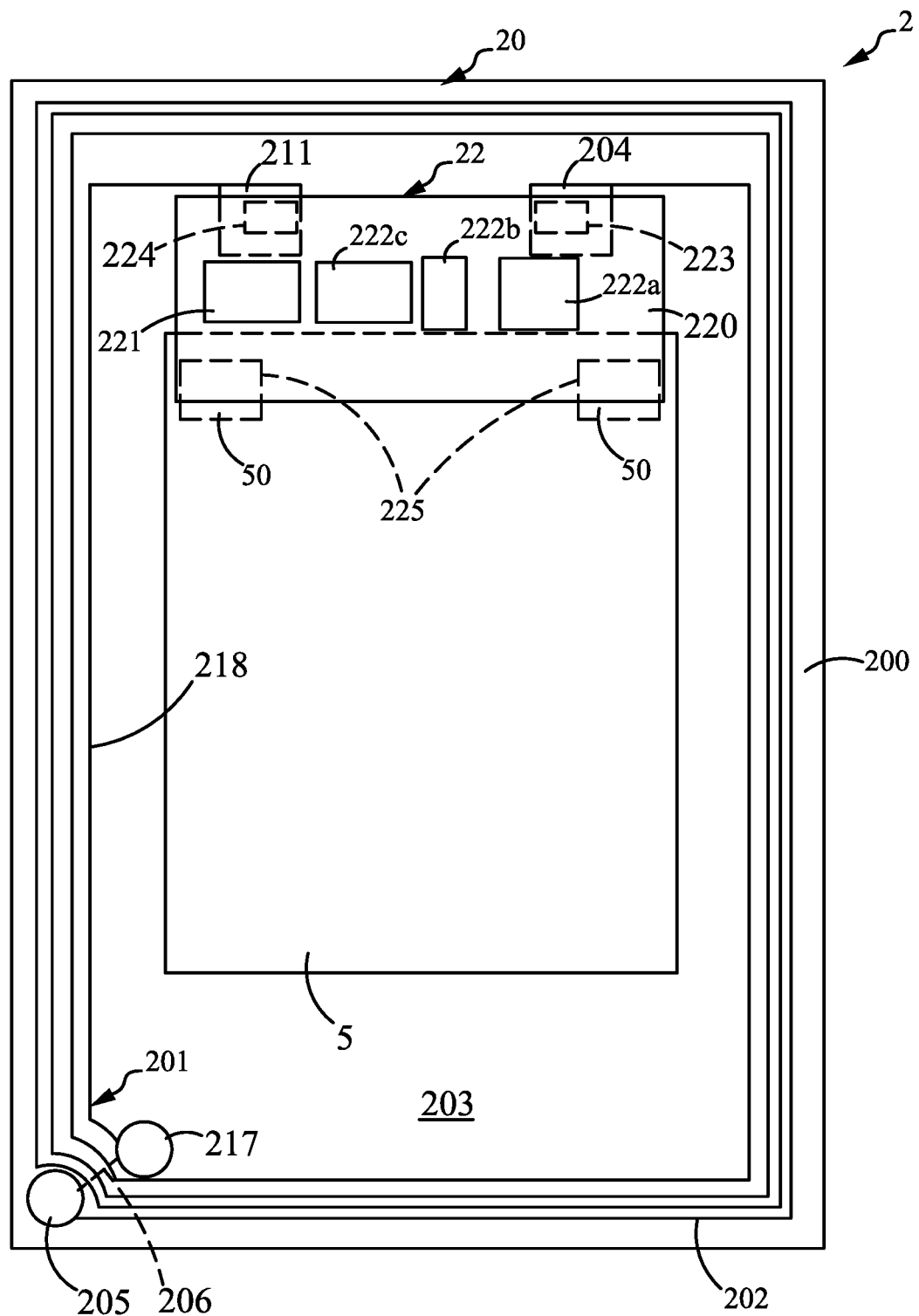
FIG. 1 illustrates a structure of RFID sensing and recording device according to one exemplary embodiment of the present invention.

Please refer to FIG. 1, which illustrates a structure of the radio frequency identification (RFID) device according to the one embodiment of the present invention. The RFID device 2 comprises an antenna module 20, a RFID sensing module 22, and a battery module 5. The antenna module 20 comprises a flexible substrate 200 and an antenna circuit 201 for receiving high frequency (HF) signal, such as 11-16 MHz, or ultra high frequency (UHF) signal, such as 800-1000 MHz.

Figure 2A:
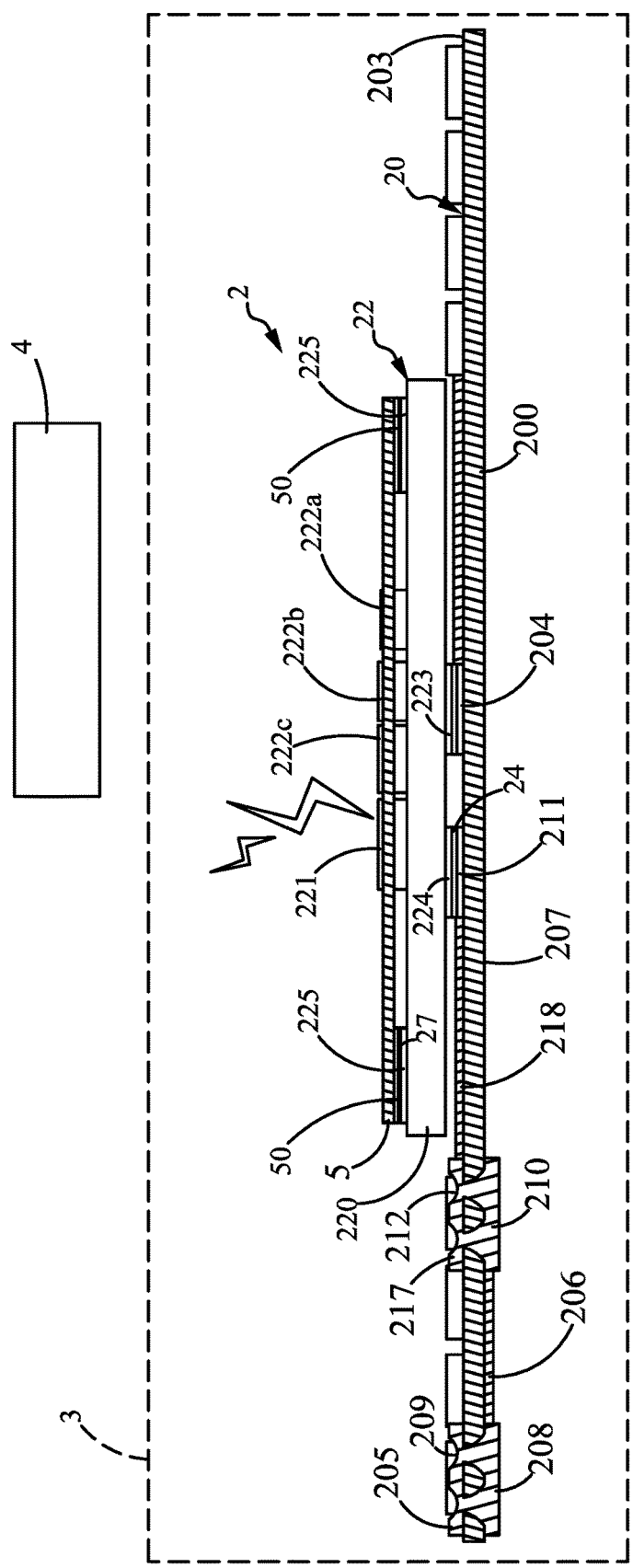
FIG. 2A illustrates a layout of antenna circuit according to one exemplary embodiment of the present invention.

The antenna circuit 201 is formed on surface of the flexible substrate 200. In one embodiment, the antenna circuit 201 has a first antenna 202 formed on a first surface 203 of the flexible substrate 200. The first antenna 202 has a specific circuit pattern. In the present embodiment, the pattern is a multi-turn pattern but it is not limited thereto. In one alternative embodiment, the first antenna 202 has a hollow pattern with a specific shape. This hollow pattern is formed by etching a metal layer formed on the flexible substrate 200. In FIGS. 1 and 2A, one end of the first antenna 202 has a first electric pad 204 while the other end of the first antenna 202 is connected to a first relay pad 205. The first electric pad 204 and the first relay pad 205 can be made of metal material, such as aluminum or copper, for example. The first relay pad 205 is coupled to a relay circuit 206.

In the embodiment shown in FIGS. 1 and 2A, the relay circuit 206 is formed on a second surface 207 opposite to the first surface 203. The first pad 205 is electrically connected to a second relay pad 208 coupled to one end of the relay circuit 206 through a crimping process. Likewise, the second relay pad 208 is made of metal material, e.g., copper and aluminum. In one embodiment, the crimping process is operated by press molding wherein a plurality of areas of the first relay pad 205 are pressed to deform by the mold wherein the deformed metal penetrates through the flexible substrate 200 and are electrically connected to the second relay pad 208. After the crimping process, a plural recess structures corresponding to the plurality of areas 209 of the first relay pad 205 are formed.

Likewise, the other end of the relay circuit 206 is connected to a third relay pad 210 which is made of electrically conductive metal such as aluminum or copper, for example. The fourth relay pad 217 is crimped to connect to the third relay pad 210 formed on the second surface 207. In one embodiment, the crimping process is performed by press molding, e.g., hot press molding, such that a plurality of areas 212 of the fourth relay pad 217 are pressed to penetrate through the flexible substrate 200 and are electrically connected to the third relay pad 210. After the crimping process, a plurality of recess structures respectively corresponding to the plurality of areas 212 of the fourth relay pad 217 are formed. The fourth relay pad 217 is electrically coupled to the second electric pad 211 through an antenna segment 218.

Figure 2B:
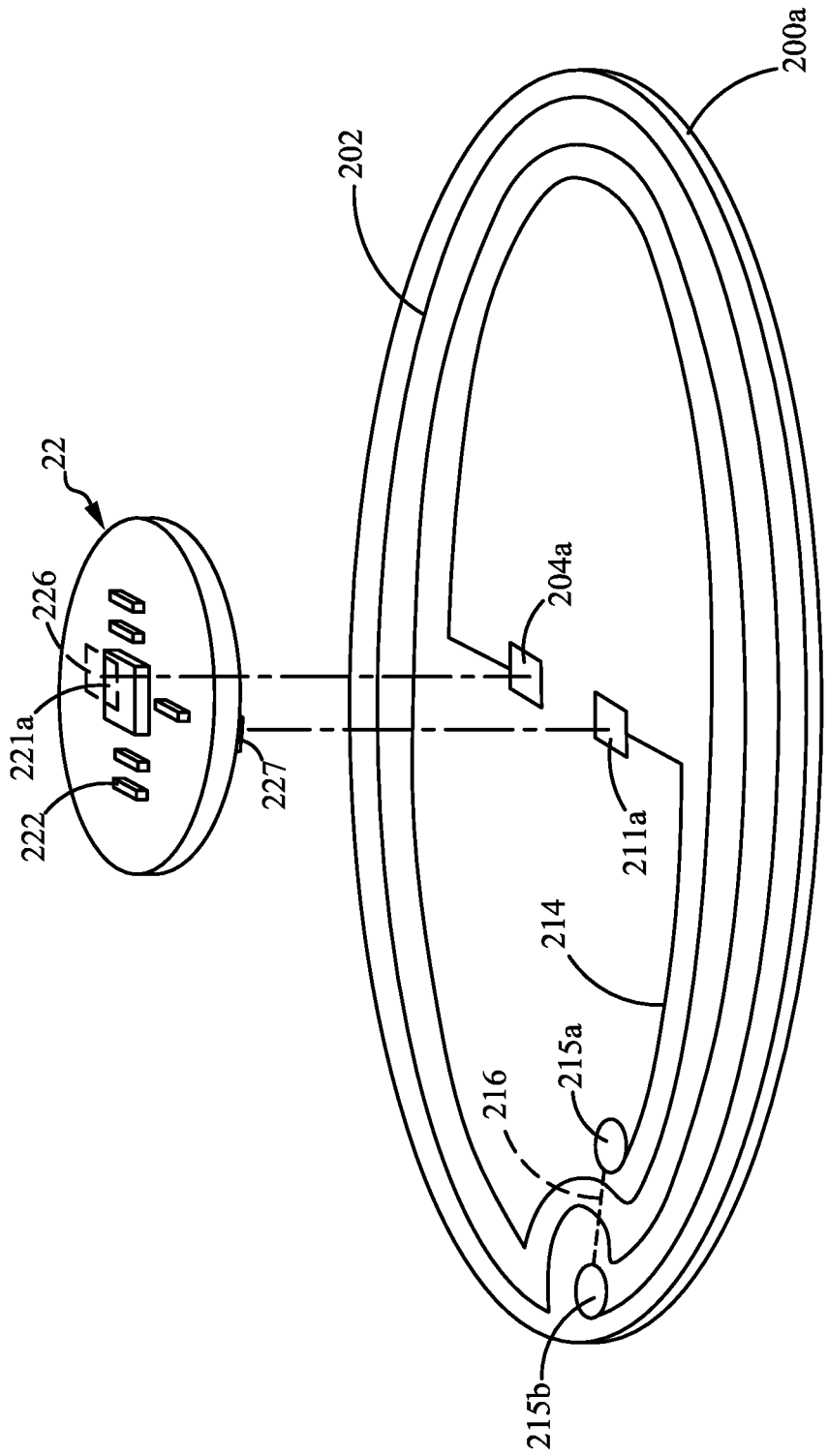
FIG. 2B illustrates structure of RFID sensing and recording device according to another exemplary embodiment of the present invention.

In addition, it is noted that the pattern design of the antenna circuit 201 is determined according to the actual need and it is to be understood that the invention is not limited to the specific embodiments shown in FIG. 2A. For example, please refer to FIG. 2B, which illustrates elliptical shape antenna 202 formed on a surface of the substrate 200a. The substrate 200a can be, but should not be limited to, a flexible substrate. The substrate 200a has a first electric pad 204a and a second electric pad 211a electrically connected to electrical connecting terminals 226 and 227 of the RFID sensing module 22, respectively. The RFID sensing module 22 is a chip on board (COB) module having integrated circuit (IC) chip 221a, such as RFID chip, and electrical components 222, such as passive components, detecting sensors, and/or a storage module, formed on the RFID sensing module 22. The passive components can be, but should not be limited to, resistor, capacitor, inductor, or a combination thereof while the detecting sensor can be, but should not be limited to, a temperature sensor or humidity sensor. One end of antenna 202 is electrically connected to the first electric pad 204a while the other end of antenna 202 is connected to an electrical terminal 215b. The second electrical connecting pad 211a is electrically connected to the electrical terminal 215a through an antenna segment 214. The electrical terminals 215a and 215b penetrate through the substrate 200a and are crimped or coupled to each other through a conductive wire 216.

It is noted that although the embodiments shown in FIGS. 1 and 2A illustrate that the crimping process is performed by crimping the first relay pad 205 to the second relay pad 208 as well as crimping the fourth relay pad 217 to the third relay pad 210, in an alternative embodiment, it is possible to perform the crimping process by crimping the second relay pad 208 to the first relay pad 206 and crimping the third relay pad 210 to the fourth relay pad 217 whereby the recess structures of the area 209 and 212 respectively shown in FIGS. 1 and 2A will be formed on the surface of first relay pad 205 and fourth relay pad 217. The crimping process can be performed according to the actual need of the manufacture and can be varied by the one having ordinary skilled in the art according to the actual requirement so that it is to be understood that the invention is not limited to the specific embodiments shown in FIGS. 1 and 2A.

Through the layout design of the antenna circuit shown in FIGS. 1 and 2A, the first and second electric pads 204 and 211 of the antenna circuit 201 can be arranged closely or concentrated in the same area. That is, the antenna circuit 201 does not pass through the area between the first and second electric pads 204 and 211 so that the problem of accidental electrical short circuit with the antenna circuit can be prevented in the subsequent manufacturing process where the substrate module 21 is electrically coupled to the antenna module 20 whereby the manufacturing process of bonding the substrate module 21 and antenna module 20 can be simplified.

Referring back to FIGS. 1 and 2A, the RFID sensing module 22 comprises a substrate 220, RFID chip 221, and at least one passive component 222a, sensor 222b, and a storage module 222c. The substrate 220 can be a rigid substrate or flexible substrate. The RFID sensing module 22 is a COB substrate module or FPC module. In the present embodiment, the RFID sensing module 22 is a FPC module wherein the substrate 220 is a flexible substrate. The RFID chip 221 is coupled to the substrate 220. The at least one passive component 222a is electrically coupled to the substrate 220 and electrically coupled to the RFID chip 221. The passive component 222a can be a capacitor, resistor, inductor, or any combination thereof. The user can select appropriate components and arrange those selected components on the substrate 220 according to the requirement and characteristics of electrical circuit. The RFID chip 221 can be active RFID chip or passive RFID chip.

The sensor 222b, in the present embodiment, can be, but should not be limited to, a temperature sensor, humidity sensor, atmospheric pressure sensor, or gas sensor. The sensor 222b is arranged on the substrate 220 and is electrically coupled to the storage module 222c, for transmitting the sensing data to the storage module 222c so that the storage module 222c can store the sensing data. In another embodiment, the sensor 222b can be an accelerometer, orientation sensor, magnetometer, for detecting the acceleration information, position information or orientation information. The sensor 222b, in the present embodiment, is utilized to detect a status information and generate a plurality of data with respect to the status information. In one embodiment, the status information is environmental information such as temperature, humidity, and/or atmospheric pressure. Alternatively, the status information can also be a motion information such as acceleration or velocity, and/or orientation information. The storage module 222c is arranged on the substrate 220 and is electrically coupled to the RFID chip 221, and sensor 222b for storing the plurality of data generated by the sensor 222b.

The substrate 220 further comprises a pair of third electric pads 223 and 224 respectively coupled to the first and second electric pads 204 and 211. In the present embodiment, conducive adhesives 24 is arranged between the first electric pad 204 and one of third electric pads 223, and between the second electric pad 211 and the other one of the third electric pads 224. The first and second electric pads 204 and 211 are electrically coupled to the pair of third electric pads 223 and 224 through a hot pressing process. It is noted that the way for electrically coupling the electric pads is not limited to the hot press. In addition, the conductive adhesives can be, but should not be limited to, a moisture curing conductive adhesive, UV curing conductive adhesive, heat curing conductive adhesive, or conductive pressure-sensitive adhesives.

In addition, the substrate 220 further comprises an electrical connector 225. In the present embodiment, the electric connector 225 is a pair of electrodes electrically coupled to positive and negative electrodes of the battery module 5. The batter module 5, in one embodiment, is a thin film battery module for providing electric power required by the RFID sensing module 22. In the present embodiment, the electric connector 225 is electrically coupled to the battery module 5 through conductive adhesives and a hot pressing process. It is noted that the way for electrically coupling the electric pads is not limited to the hot press. In addition, the conductive adhesives can be, but should not be limited to, a moisture curing conductive adhesive, UV curing conductive adhesive, heat curing conductive adhesive, or conductive pressure-sensitive adhesives.

The battery module 5, RFID sensing module 22, and antenna module 20 can be integrated into a single package so as to become an application device 3 that can be arranged or stuck on the product for monitoring the status of the product. In one embodiment, the application device 3 can be an environmental monitoring device which can be arranged in outdoor or indoor for monitoring environmental information of the environment. In one embodiment, the environmental information can be temperature, humidity, and/or Atmospheric particulate matter. The data generated by the sensor 222b of the RFID sensing module 22 can be stored in the storage module 222c of the RFID sensing module 22. The data stored in the storage module 222c can be access through a reading device 4. In addition, the application device 3 can be stuck on a food product for detecting and recording environmental status such as temperature or humidity, for example. Alternatively, the sensor in the application device 3 can be accelerometer or a combination of accelerometer and orientation sensor. Accordingly, when the application device 3 is arranged on the product, the application device 3 can detect acceleration and orientation with respect to the product. The data of acceleration and orientation can be utilized to reconstruct a motion status or a trace with respect to the product.

Next, a method for making the RFID sensing and recording device is explained below. Please refer to FIG. 3A, the present embodiment, the method comprising steps described below. Firstly, an antenna module 20 is formed. The antenna module 20 comprises a flexible substrate 200 having an antenna circuit 201 formed thereon. In the present embodiment, the thickness of the flexible substrate 200 is 20-500 µm. It is noted that the antenna circuit 201 can be formed on single side or double sides of the flexible substrate 200.

Next a method for making the antenna circuit is explained. In one embodiment, taking the antenna circuit shown in FIG. 1 as an example, a metal layer is respectively formed on the first surface 203 and the second surface 207 of the flexible substrate 200. The metal layer can be aluminum foil layer or copper foil layer. Next, a metal etching process, such as aluminum etching or copper etching according to the material of the metal layer, is adapted for etching the metal layer thereby forming the first antenna 202 of the antenna circuit 201, the first electric pad 204 and the second electric pad 211, and the first relay pad 205 and fourth relay pad 217 respectively coupled to the first antenna 202 on the first surface 203, and forming the relay circuit 206, the second relay pad 208 and the third relay pad 210 on the second surface 207. It is noted that although the antenna in the present embodiment is a loop type antenna, alternatively, the antenna can be a hollow structure with specific shape formed by metal etching process. After that, a crimping process is utilized to electrically connect the first relay pad 205 to the second relay pad 208, and electrically connect the fourth relay pad 217 to the third relay pad 210.

Since the first antenna 202 is a multi-turn coil like the pattern shown in FIG. 1, the first and second electric pads 204 and 211 can be closely arranged at the same area. That is, there has no antenna circuit passing through the area between the first and second electrical connecting pads 204 and 211 so as to simplify circuit layout design of the substrate module whereby short circuit with the antenna circuit in the subsequent manufacturing process can be efficiently prevented. In addition, the crimping process is performed by using a press molding wherein a plurality of areas of the first relay pad 205 are pressed to deform by the mold so that the deformed metal penetrates through the flexible substrate 200 and are electrically connected to the second relay pad 208, and a plurality of areas of the fourth relay pad 217 are pressed to deform by the mold so that the deformed metal penetrates through the flexible substrate 200 and are electrically connected to the third relay pad 210.

Please refer to FIG. 3B, after the step of providing antenna module 20, a RFID sending module 22 is provided. The RFID sensing module 22 comprises a substrate 220 having a pair of third electric pads 223, and 224, a RFID chip 220, at least one passive elements 222a, at least one sensor 222b, and a storage module 222c whereby the RFID sensing module 22 has capability of detection and storing data corresponding to the detection. In one embodiment, the substrate 220 is a flexible substrate. In alternative embodiment, the substrate 220 can also be a rigid type substrate, such as printed circuit board (PCB).

Next, please refer to FIG. 3C, a conductive adhesive 24 is formed on the first and second electrical connecting pads 204 and 211. In the present embodiment, the conductive adhesive 24 is electrically conductive adhesive that can be utilized in the hot pressing process. The conductive adhesive 24 can be, but should not limited to, anisotropic conductive film (ACF), anisotropic conductive paste (ACP), or anisotropic conductive adhesive (ACA) or solder anisotropic conductive paste (SACP). In one embodiment, the amount of the conductive adhesive 24 is less than or equal to 1 mg. In addition, the conductive adhesives 24 can be, but should not be limited to, a moisture curing conductive adhesive, UV curing conductive adhesive, heat curing conductive adhesive, or conductive pressure-sensitive adhesives.

Figure 3E:
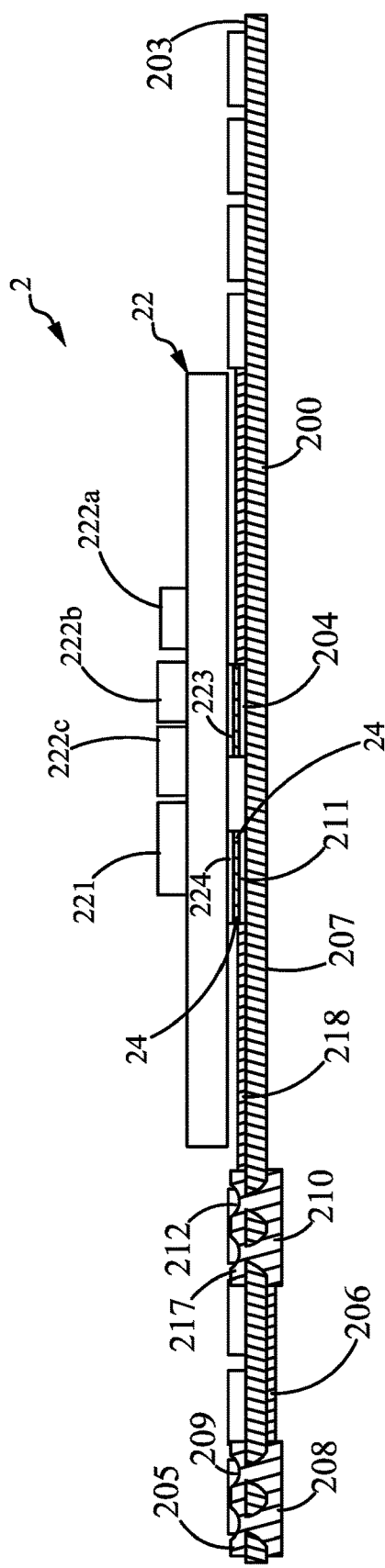

Next, please refer to FIG. 3D, the pair of third electric pads 223 and 224 of RFID sensing module 22 is respectively electrically coupled to the first and second electric pads 204 and 211 of antenna module 20 through a hot pressing process. In one embodiment, the temperature for operating the hot pressing process is lower than or equal to 200° C., and the pressing time is less than or equal to 20 seconds. After the hot pressing process, the RFID sensing module 22 and antenna module 20 is bonded as the structure shown in FIG. 3E. The apparatus for hot pressing process which is well known by the one having ordinary skilled in the art will not be described hereinafter. It is noted that, the conductive adhesive 24 can also be coated on the third pair of the electric pads 223 and 224. After that, the first and second electric pads 204 and 211 are pressed to electrically connect to the third pair of electric pads 223 and 224, respectively.

Figure 3F:
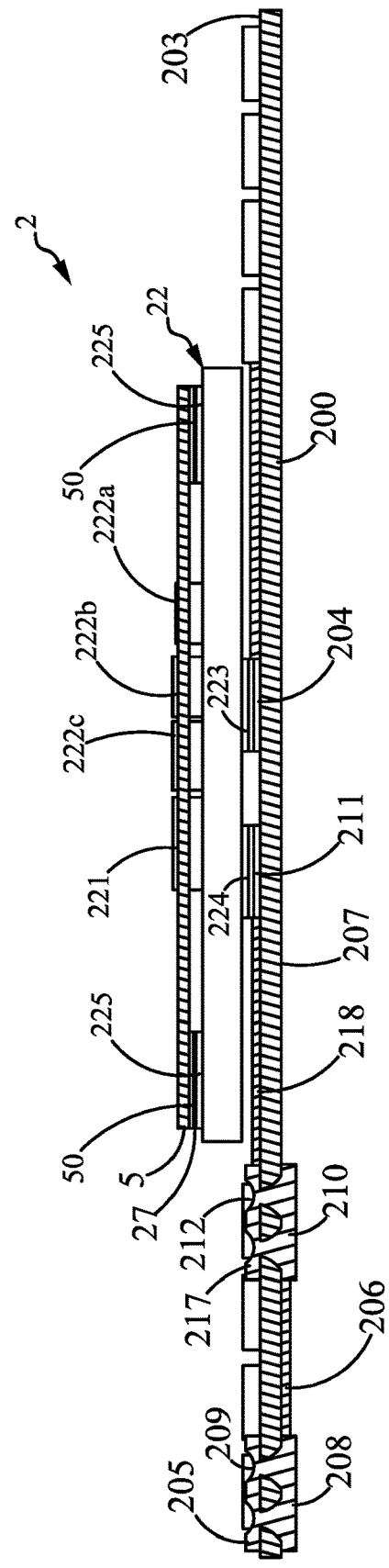

After connecting the antenna module 20 to the RFID sensing module 22, referring to the FIG. 3F, a battery module 5 is coupled to the RFID sensing module 22. In the present step, conductive adhesive 27 is coated on the electric connector 25 on the RFID sensing module 22 or coated on the electrodes 50 of the battery module 5. After that, the battery module 5 and RFID sensing module 22 are connected to each other through a hot pressing process whereby the RFID sensing module 22, the battery module 5, and the antenna module 20 are integrated to form the RFID sensing and recording device 2. In one embodiment, the battery module 5 is a thin film battery. Since the battery module 5 is the thin film battery, the RFID sensing and recording device 2 can be more compact and light. In addition, with the power supply by the battery module 5, the device 2 can be applied is various kinds of application fields, especially, in the field required long term motoring. It is noted that the positions of the pair of third electric pads 223 and 224, and the electric connector 225 are not limited to the positions illustrated in the figure of the present embodiment. It is decided according to the need of the user.

Moreover, in one alternative embodiment, a plurality of antenna modules 20 can be formed on a material roll 9 in advance. In one embodiment, such as the manufacturing system shown in FIG. 4A, the plurality of antenna modules 20 is formed on the material roll 9, and the RFID sensing and recording device 2 can be manufactured through a roll-to-roll process. The roll-to-roll transportation module 30 is utilized to transmit the plurality of antennal modules 20 from one side to the other side through rotating the material roll 9. Each antenna module 20, such as the structure shown in FIG. 1 or FIG. 2A, has a flexible substrate having antenna circuit on one surface or two opposite surfaces. In the present embodiment, the flexible substrate has a relay circuit formed on one surface and an antenna circuit on the other surface. The thickness of the flexible substrate is less than or equal to 500 μm. It is noted that the roll-to-roll transportation module 30 comprises a plurality of driving and driven mechanism. In the present embodiment, the roll-to-roll transportation module 30 comprises a plurality of rollers 301, 302, and 303 including at least one driving roller and a plurality of driven rollers, wherein a roller 302 carries the material roll 9, and one end of the material roll 9 is coupled to the roller 303 utilized to receive material band of the material roll 9 passing through the plurality of rollers 301.

In the present embodiment, since the surface area of the material band of the material roll 9 is large, a plurality of crimping apparatuses 32 can be arranged along the width direction Y of the material roll 9, each of which is corresponding to an antenna module 20 formed on the material roll 9. By means of the transportation of the material band of the material roll 9 through the roll-to-roll transportation module 30 along the X direction, each crimping apparatus 2 performs the crimping process toward the antenna module 20 passing therebelow, thereby making two isolated circuit, i.e., antenna circuit and relay circuit, respectively formed on the two opposite surfaces of the flexible substrate 20, electrically connected. Thereafter, the material roll 9 on the roller 303 is released and arranged on another roll-to-roll system 3a, wherein the roll-to-roll system 3a comprises a plurality of first coating units 33, a plurality of hot pressing units 34, a plurality of second coating units 35, and a plurality of combining units 36.

Figure 4A:
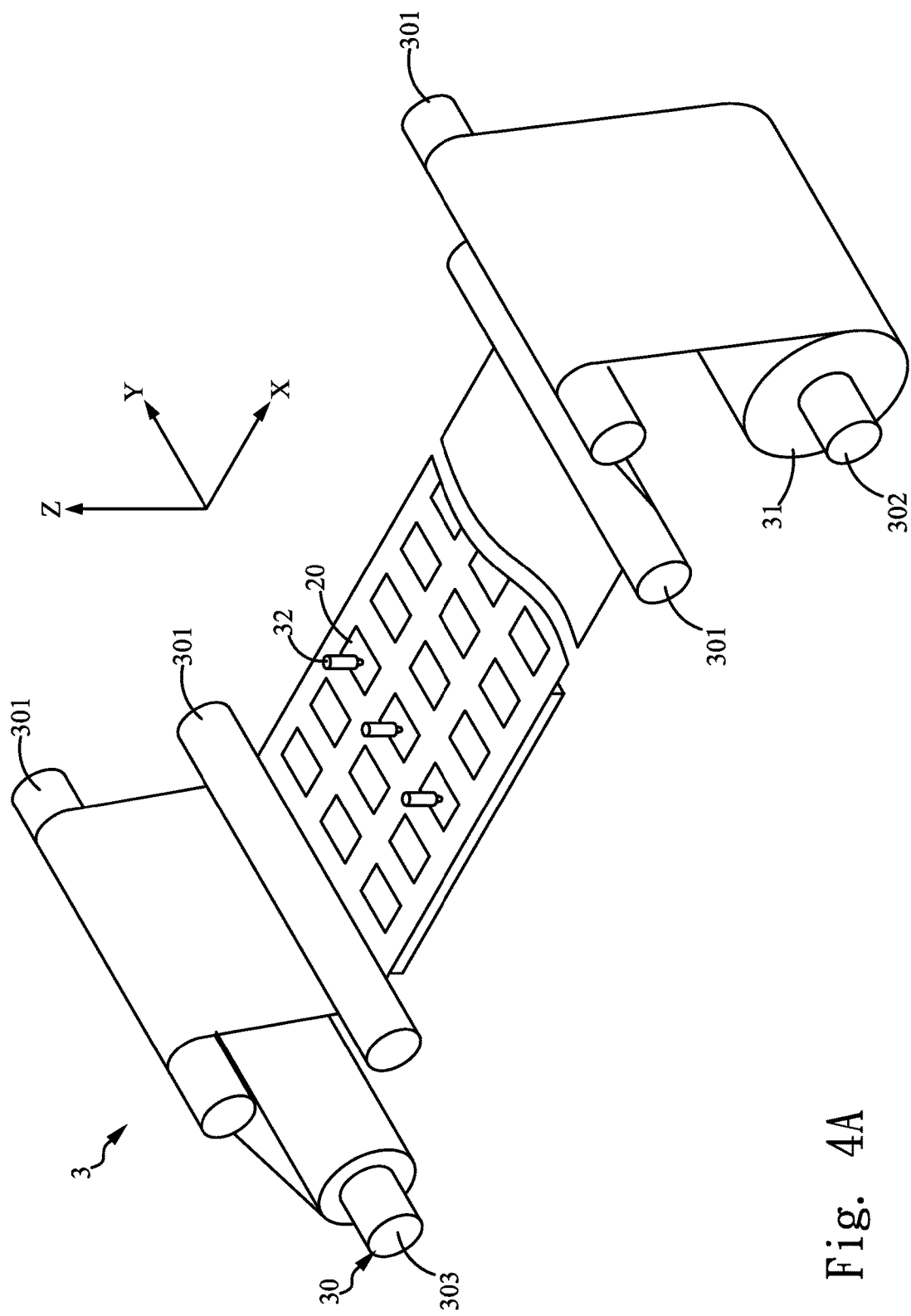
FIGS. 4A and 4B illustrate a roll-to-roll manufacturing system for making the RFID sensing and recording device according to one embodiment of the present invention.
Figure 4B:
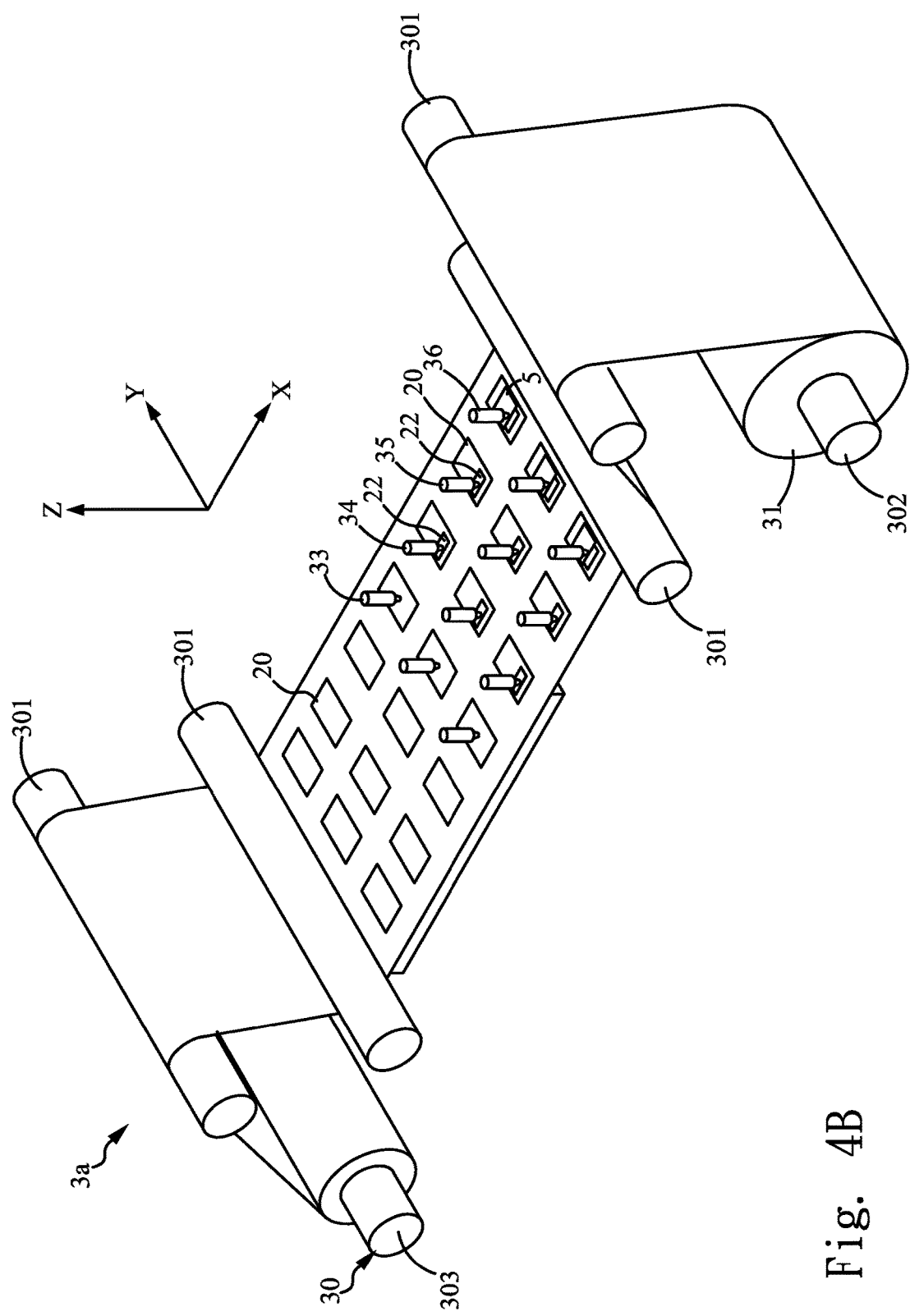

The first coating unit 33 is utilized to coat conductive adhesives on the first and second electric pads 204 and 211 so as to form the state shown as FIG. 3C. Then the RFID sensing modules 22 are respectively arranged on the antenna modules 20 corresponding to each hot pressing unit 34. The RFID sensing module 22 is electrically coupled to the antenna module 20 through a hot pressing process performed by the hot pressing unit 34. The states are illustrated respectively as FIGS. 3D and 3E. The second coating unit 35 is utilized to coat a conductive adhesive on the electric connector on the RFID sensing module 22. Then the battery modules 5 are respectively arranged on the RFID sensing modules 22 corresponding to the combining unit 36. Each combining unit 36 makes the battery module 5 electrically couple to the RFID sensing module, wherein the electrodes of the battery module 5 are corresponding to the electric connector of the RFID sensing module 22 so as to form the structure shown in 3F. It is noted that the conductive adhesive 24 can be, but should not limited to, anisotropic conductive film (ACF), anisotropic conductive paste (ACP), or anisotropic conductive adhesive (ACA) or SACP. In addition, the conductive adhesives can be, but should not be limited to, a moisture curing conductive adhesive, UV curing conductive adhesive, heat curing conductive adhesive, or conductive pressure-sensitive adhesives. In addition, although the systems shown in FIG. 4A and FIG. 4B are separated manufacturing system, it is noted that the two systems shown in FIGS. 4A and 4B can be integrated as single system according to the actual requirement.

According to the abovementioned embodiments, the flexible antenna module is electrically bonded with a RFID sensing module having RFID chip and passive elements through conductive adhesives and pressing procedure without a reflow process. The reflow process can be eliminated thereby reducing the manufacturing cost and the weight of the RFID sensing and recording device can be reduced so as to make the RFID sensing and recording device thinner and lighter.

In addition, the area between electric pads formed on the substrate of the antenna module does not have antenna circuit passing therethrough so that the circuit layout of the electrical connection between the substrate module and antenna module can be simplified thereby simplifying the manufacturing process of connection between the substrate module and antenna module. Moreover, with the power, sensor and storage integrated together, the RFID sensing and recording device of the present invention can be expanded to be applied in various kinds of fields such as internet of things, interface of human-computer interaction, smart living, smart logistics, and medical care.

While the present invention has been particularly shown and described with reference to a preferred embodiment, it will be understood by those skilled in the art that various changes in form and detail may be without departing from the spirit and scope of the present invention.

What is claimed is:

1. A RFID sensing and recording device comprising:
an antenna module comprising a first flexible substrate, an antenna circuit formed on the first flexible substrate, and a first electric pad and a second electric pad formed on a first surface of the first flexible substrate, wherein the first and second electric pads are electrically coupled to the antenna circuit;
a RFID sensing module, comprising a second flexible substrate, and a pair of third electric pads, a RFID chip, a sensor, and a storage module formed on the second flexible substrate, wherein the pair of third electric pads are electrically coupled to the first and second electric pads, respectively, the sensor is configured to detect a status information and generate a plurality of status data corresponding to the status information, and the storage module is electrically coupled to the sensor and the RFID chip for storing the plurality of status data; and
a battery module, electrically coupled to the RFID sensing module for providing electric power to the RFID sensing module;
wherein the antenna circuit further comprises:
a first antenna, formed on the first surface of the first flexible substrate, wherein the first antenna comprises a first antenna segment having a first end electrically coupled to the first electric pad, a second end electrically coupled to a first relay pad, and a second antenna segment having two ends electrically coupled to the second electric pad and a fourth relay pad, respectively; and
a relay circuit, formed on a second surface of the first flexible substrate, wherein the relay circuit comprises a first end having a second relay pad, a second end having a third replay pad, wherein the first relay pad is crimped to the second relay pad, and the third relay pad is crimped to the fourth relay pad.

2. The device of claim 1, wherein conductive adhesives are arranged between the pair of third electric pads and the first and second electric pads respectively corresponding to the pair of third electric pads, and the pair of third electric pads are electrically bonded to the first and second electric pads through a hot pressing process, respectively.

3. The device of claim 1, wherein the battery module is a flexible thin film battery module.

4. A method for making a RFID sensing and recording device, comprising steps of:
providing an antenna module comprising a first flexible substrate, an antenna circuit formed on the first flexible substrate, and a first electric pad and a second electric pad formed on a first surface of the first flexible substrate, wherein the first and second electric pads are electrically coupled to the antenna circuit, wherein the antenna circuit does not pass through an area between the first and second electric pads;
providing a RFID sensing module, comprising a second flexible substrate, and a pair of third electric pads, a RFID chip, a sensor, a pair of electrodes, and a storage module formed on the second flexible substrate, wherein the pair of third electric pads are electrically coupled to the first and second electric pads, respectively, the sensor is configured to detect a status information and generate a plurality of status data corresponding to the status information, and the storage module is electrically coupled to the sensor and RFID chip for storing the plurality of status data;
forming a first conductive adhesive on the first and second electric pads or the pair of third electric pads;
electrically connecting the pair of third electric pads to the first and second electric pads via the first conductive adhesive; and
electrically connecting a battery module to the RFID sensing module.

5. The method of claim 4, wherein the step of providing the antenna module includes forming the antenna circuit, which comprises:
forming a first antenna on the first surface of the first flexible substrate through a first metal etching process;
forming a relay circuit comprising a second relay pad and a third relay pad on a second surface of the first flexible substrate through a second metal etching process;
electrically connecting the second relay pad of the relay circuit to the first electric pad of the first antenna through a crimping process; and
electrically connecting the third relay pad of the relay circuit to the second electric pad through the crimping process.

6. The method of claim 5, wherein forming the first antenna further comprises steps of:

forming a first relay pad and a first antenna segment having a first end and a second end respectively coupled to the first electric pad and the first relay pad; and forming a fourth relay pad and a second antenna segment having two ends respectively coupled to the second electric pad and a fourth relay pad.

7. The method of claim 6, wherein the crimping process further comprising steps of:

electrically connecting the first relay pad to the second relay pad through a press molding process; and electrically connecting the third relay pad to the fourth relay pad through the press molding process.

8. The method of claim 4, further comprising a step of connecting the pair of third electric pads to the first and second electric pads through a hot pressing process.

9. The method of claim 4, wherein the antenna circuit does not pass through an area between the first and second electric pads.

10. The method of claim 4, wherein the antenna module is formed on a material roll.

11. The method of claim 4, wherein the battery module is a flexible thin film battery module.

12. A RFID sensing and recording device comprising:

an antenna module comprising a first flexible substrate, an antenna circuit formed on the first flexible substrate, and a first electric pad and a second electric pad formed on a first surface of the first flexible substrate, wherein the first and second electric pads are electrically coupled to the antenna circuit, wherein the antenna circuit does not pass through an area between the first and second electric pads;

a RFID sensing module, comprising a second flexible substrate, and a pair of third electric pads, a RFID chip, a sensor, and a storage module formed on the second flexible substrate, wherein the pair of third electric pads are electrically coupled to the first and second electric pads, respectively, the sensor is configured to detect a status information and generate a plurality of status data corresponding to the status information, and the storage module is electrically coupled to the sensor and the RFID chip for storing the plurality of status data; and a battery module, electrically coupled to the RFID sensing module for providing electric power to the RFID sensing module.

\* \* \* \* \*